Aug. 2, 1927.

J. WENZ 1,637,758

CHAIN MAKING MACHINE

Filed Jan. 16, 1925

Inventor:
Jonathan Wenz
by Arthur B. Jenkins.
Attorney.

Aug. 2, 1927. J. WENZ 1,637,758
CHAIN MAKING MACHINE
Filed Jan. 16, 1925 6 Sheets-Sheet 3
Fig. 3.
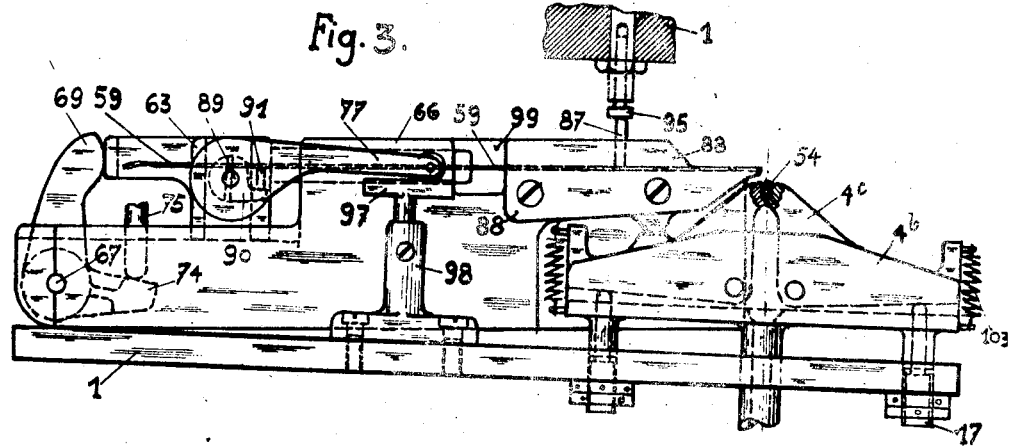
Fig. 4.
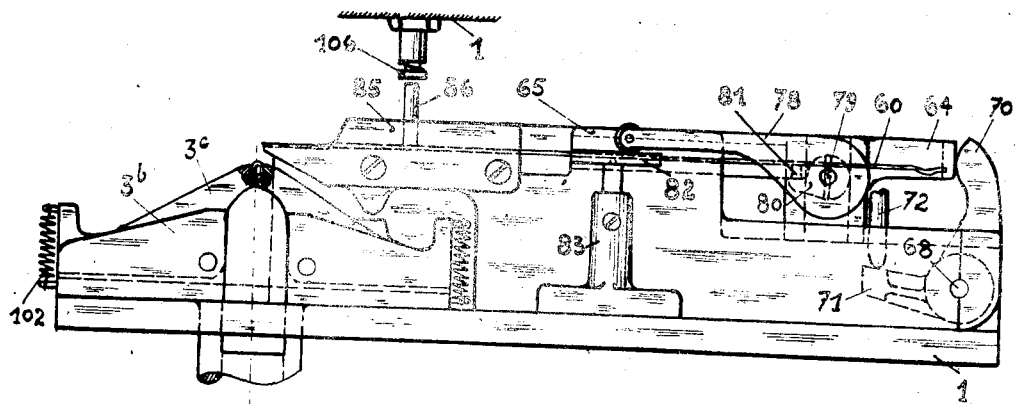
Fig. 5. Fig. 6. Fig. 7. Fig. 8.
   
Inventor:
Jonathan Wenz Aug. 2, 1927.

J. WENZ 1,637,758

CHAIN MAKING MACHINE

Filed Jan. 16, 1925

Inventor:
Jonathan Wenz

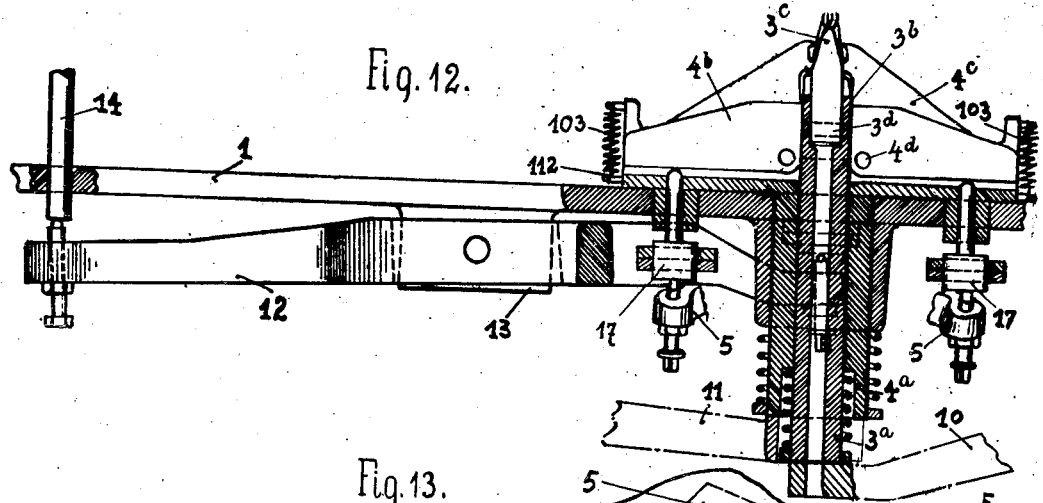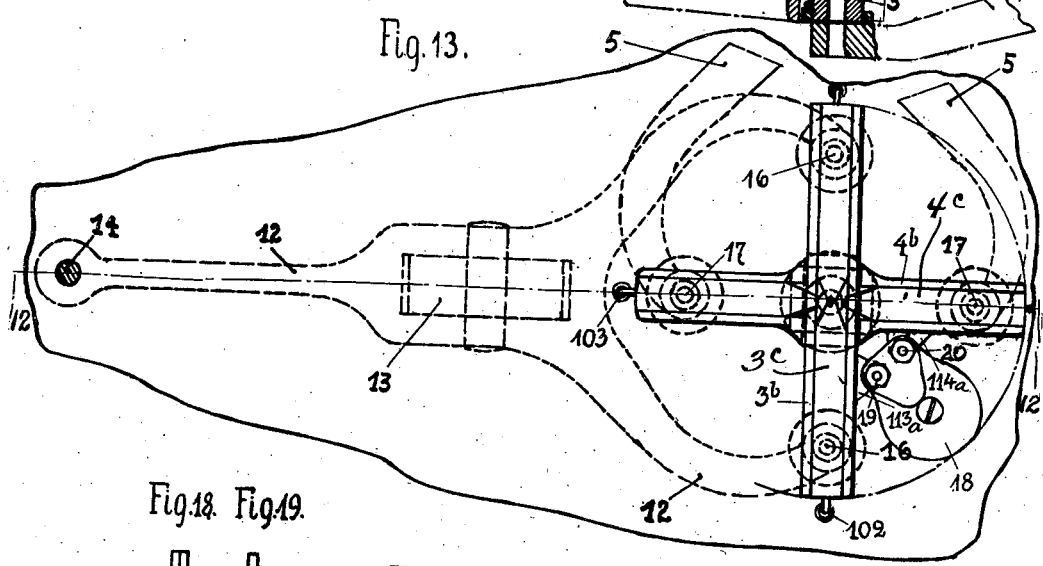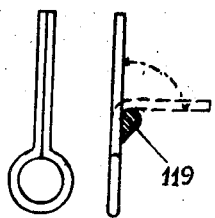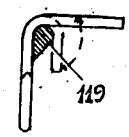

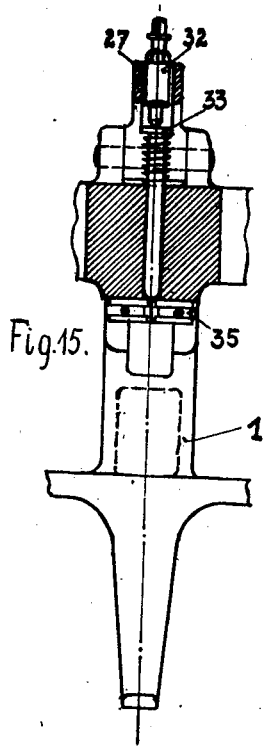
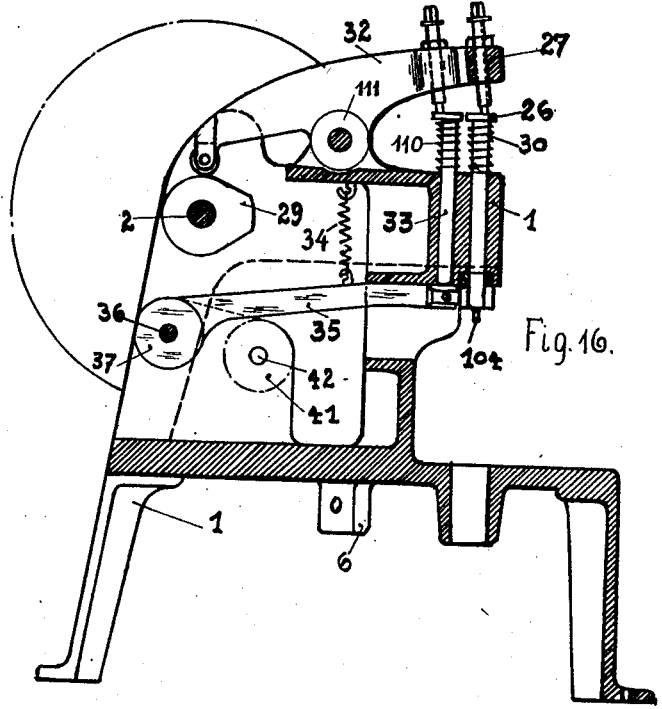
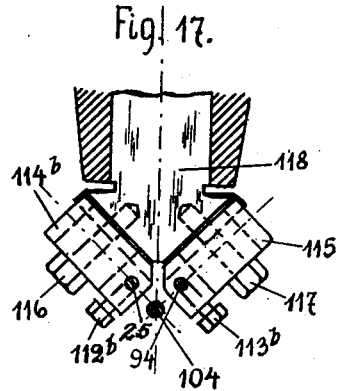
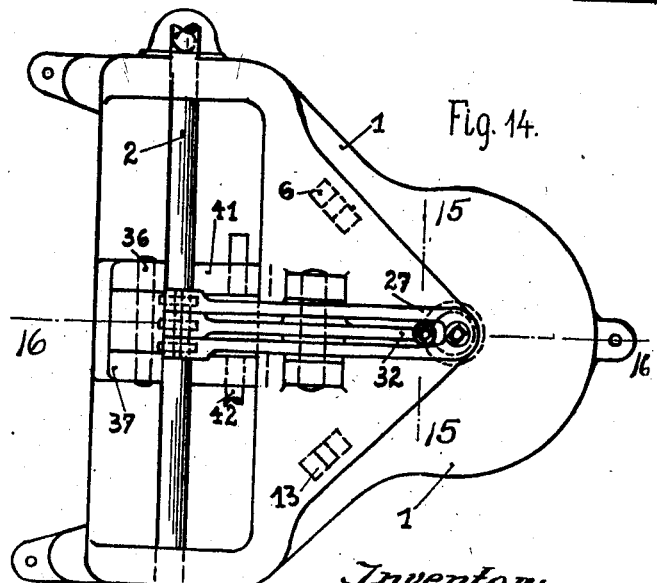

Patented Aug. 2, 1927.

1,637,758

UNITED STATES PATENT OFFICE.

JONATHAN WENZ, OF PFORZHEIM, GERMANY.

CHAIN-MAKING MACHINE.

Application filed January 16, 1925, Serial No. 2,780, and in Germany February 6, 1924.

This invention relates to chain-making machines of that type in which a severed length of wire is forced down by a forming arbor between jaws. In the known machines of this kind which have but one pair of such jaws and one wire-feeding mechanism the jaw head after having formed the link must be rotated 90° in a position to permit the next advancing feed of the wire to pass through the link just formed, then moved down and rotated back 90° to form the new link. During these rotations all the other link-forming members must be stopped and three quarters of a revolution of the cam shaft are necessary to cause the said rotations. So much time is lost.

When the known machines are used to form chains with links of different sizes, means for advancing different lengths of wire, for causing the cutter to intermittently sever the wire into lengths differing from that fed by the wire feed, for selecting and positioning different sized arbors, for preliminarily closing the wire ends bent into shape and other means must be provided.

It is the principal object of this invention to simplify such a machine and to provide means for making such chains in a shorter time than before.

In a machine embodying this invention two jaw-heads movable in vertical directions but non-rotatable are provided, arranged around a vertical center line and displaced angularly one from the other by 90° in a position diagonally to the front of the machine. Two wire-feeding mechanisms, including two forming arbors and two cutters are arranged relatively in the same position as to said center line and a link-closing die is provided in the center line of the jaw heads, all forming tools being operated by a main cam shaft so that two links are made during each revolution of this shaft.

Another object of the invention is to improve the wire-feeding mechanism and the means for moving the forming arbors in such a manner that chains with smallest links may be made and that the advancing wire passes surely through the previously formed link.

These and other features of the invention are fully described and pointed out in the appended claims.

The accompanying drawings illustrate an embodiment of the invention.

Fig. 1 is a front view of my improved machine;

Fig. 2 a horizontal sectional view taken on the line 2—2 of Fig. 1.

Fig. 3 a side elevation of the left wire-feeding mechanism and of one set of the jaw-heads, both in elevated positions;

Fig. 4 is a similar elevation of the right wire-feeding mechanism and the other jaw-head in its lowered position;

Figs. 5–8 show some chains which may be made by the machine;

Figure 9:
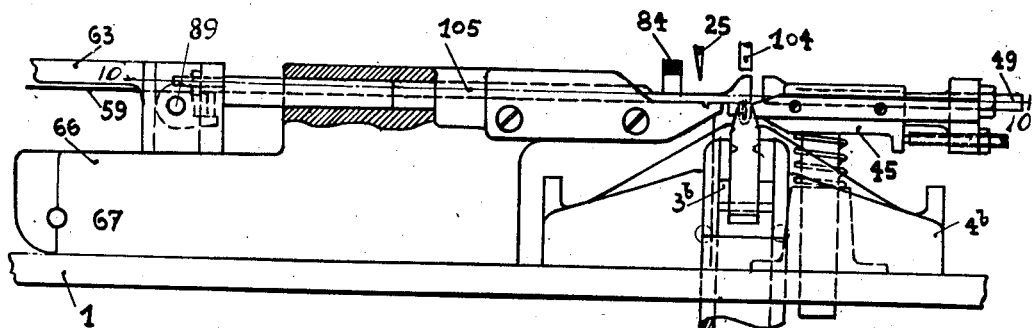
Fig. 9 is a section of the left wire-feeding mechanism, the jaw-heads and the mechanism for operating the link-forming arbor taken on line 9—9 of Fig. 10.
Figure 10:
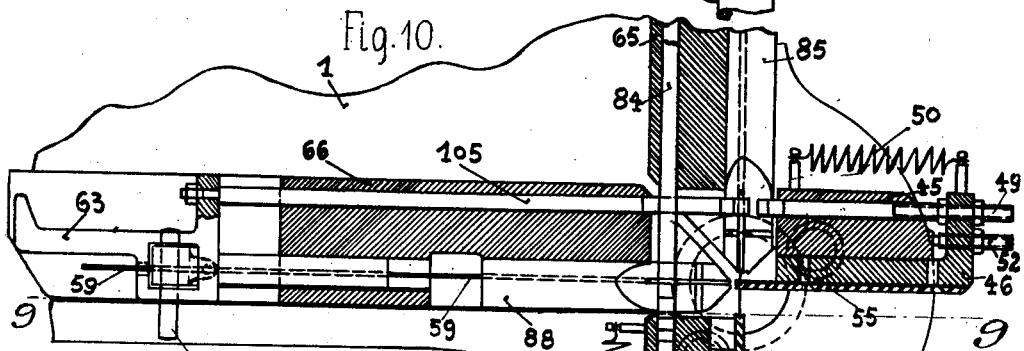
Figure 11:
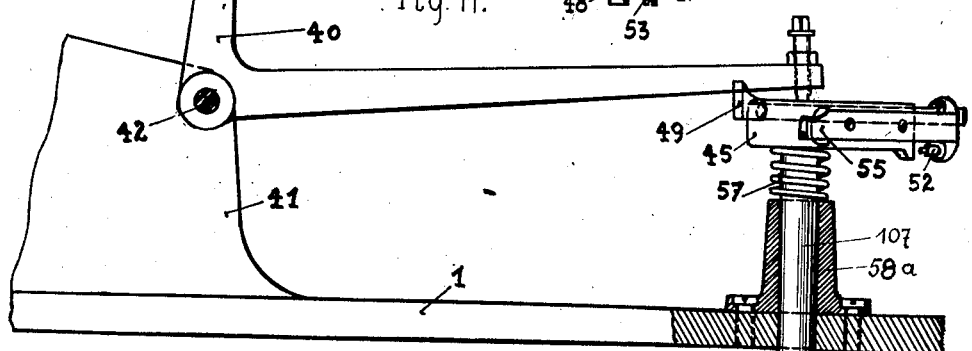

Fig. 10 a horizontal section on the dotted line 10—10 of Fig. 9;

Fig. 11 a detail showing an operating lever and the support of a forming arbor;

Fig. 12 is a section on a plane denoted by the dotted line 12—12 of Fig. 13, the forked lever being shown in full;

Fig. 13 a top view of the jaw-heads;

Fig. 14 a top view, scale reduced, of the bed of the machine with the main shaft and some operating levers;

Fig. 15 a section on line 15—15 of Figure 14 and

Fig. 16 a section on line 16—16 of Fig. 14;

Fig. 17 is a top view of the cutter head, partially in section;

Figs. 18–21 show how links, see Fig. 7, are made.

Figure 2:
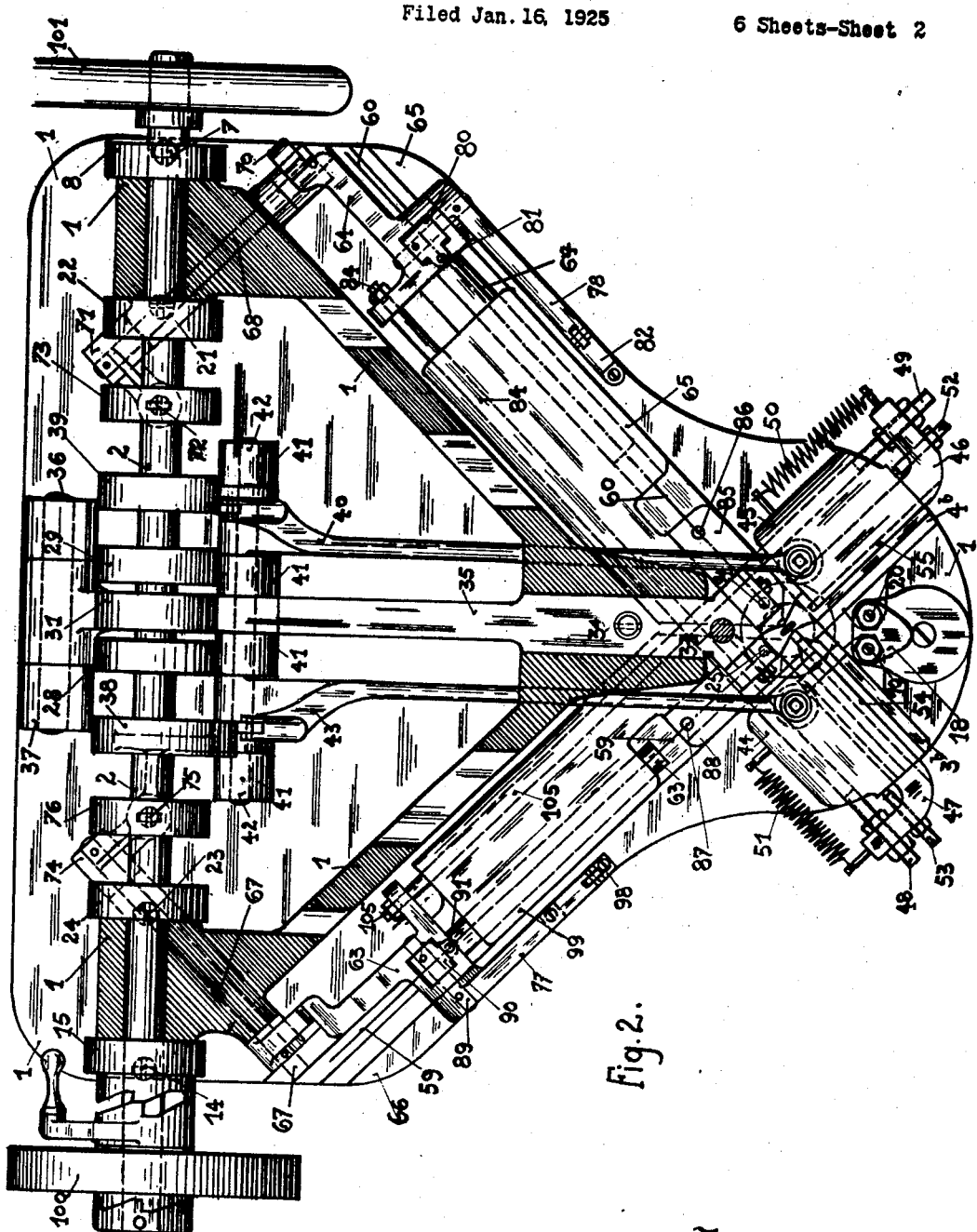

Referring to the drawings 1 designates the bed of the machine on which the mechanism is supported, said bed being mounted on three legs. The bed plate has a polygonal form, see Figs. 2 and 14 with sides partially beveled 90° one to the other and forming a semi-circle in the center of which the jaw-heads are mounted, displaced one from the other 90°.

Parallel to the beveled bed-sides two sets of wire-feeding mechanisms are mounted. In a frame rising from the bed, see Figs. 14–16, there are bearings in which the main cam shaft 2; the levers and rods operating the link-forming mechanisms and the wire-feeding mechanism are mounted. The cam shaft 2 bears at one end a wheel 101 through which the machine may be driven by hand and which serves as a fly-wheel, when the machine is driven by power. At the other end of the shaft 2 a clutch-coupling is mounted adapted to engage or disengage a pulley 100 with the cam shaft 2. Where in the following description parts of the jaw-heads, wire-feeding and link-forming arbors are designated with two numbers, one relates to the parts of one set, the other to the parts of the other set of these mechanisms.

Each of the jaw-heads mounted in the bed-plate 1, see Figs. 12 and 13, has a base-plate 112, and each of said heads has a tubular shaft $3^a$ or $4^a$, extending through the bed-plate and mounted one within the other. The base-plates have two side walls $3^b$, $4^b$ between which the jaws $3^c$, $4^c$ are mounted on pivot pins $3^d$, $4^d$.

The jaws are held in open position by springs 102, 103 and are closed to form the chain-links by rods 16, 17 actuated by forked levers 5, 12 which are pivoted in blocks 6 and 13 under the bed-plate 1. These levers are moved by cams 8 and 15 on the main shaft 2 through rods 7, 14 engaging the ends of the levers and moved back by springs 102, 103 and by the weight of the forked ends of the levers, see Fig. 1. When a pair of jaws have bent a chain link, it must be elevated in order to position such link so that the next advancing feed of wire may pass through it. This operation being finished the jaws release the chain and descend. The elevation of the jaw-heads is caused by the cams 22, 24, the rods 21, 23 and the levers 10, 11, the ends of which engage the tubular shafts $3^a$, $4^a$. The descending movement is caused by springs surrounding the tubular shafts. In order to limit the raising of the jaw-heads lips $113^a$, $114^a$ are provided on the side walls of these heads, see Fig. 13, which engage screw-pins 19, 20 mounted on a block 18. The formed chain hangs down through the center of the inner tubular shaft $3^a$. The two jaw-heads work alternately so that when one has formed a link, the other makes the next link and so on. It will be seen that the link just formed is always in position to permit the next fed wire to pass through it without turning the jaw head, as is necessary in other known machines of this type. The left set of wire-feeding mechanisms cooperates with the jaws $3^c$ and the right set with the jaws $4^c$. The wires are fed to the machine from the reels 62, 61, Fig. 1. The wire-feeding mechanisms are operated by cams 76, 73 and rods 75, 72 engaging arms 74, 71 of shafts 67, 68 which are mounted in bearings above the bed-plate of the machine. Upon the other end of these shafts are keyed arms 69, 70 the ends of which engage reciprocating feed members 63, 64, Figs. 3, 4, 9 and 10, slidable on the rear of blocks 66, 65. The feed members 63, 64 have a hole of square form in which is secured on a shaft 89, 79 an arm 90, 80 engaging a pin 91, 81, guided in a bore of the member 63, 64. When the arm 90, 80 is elevated the pin 91, 81 binds the wire guided through member 63, 64. Upon one end of the pivot 89, 79 is keyed a lever arm 77, 78 riding with a roll on a support 97, 82 which is vertically removable in a block 98, 83 mounted on the bed plate 1. The blocks 66, 65 are pivotally mounted on the shafts 67, 68 and rest in normal position with their undersides on the bed plate 1, see Fig. 4. In this position the arms 77, 78 lie with a little pressure on the supports 97, 82 and bind by arms 90, 80 and pins 91, 81 the wire 59, 60. When now a member 63 or 64 is advanced by cam 76 or 73 and rod 75 or 72 the wire is fed over the anvil 88 or 85. The anvils 88, 85 serve to support the wire when it is cut and must be adapted to resist the pressure of the cutter. In the known machines of this type the distance from the foreside of the cutting anvil to the center line of the jaw head must be large enough to allow the jaw-head to be elevated. Therefore small links cannot be made. In order to make chains with smallest links I arrange the blocks 66, 65 so that they may be swung upward in the elevation of the jaw, see Fig. 3. In this elevated position the arms 77 and 90 are down and a pin 91 or 81 has released the wire. But a pin 87, 86 in the anvil has engaged a plunger 95, 106, whereby the wire is bound so that when a member 63 or 64 now moves backward by springs 93, 92 the wire is held.

In line with the wire feed and on the other side of the jaw head center there are mounted the link-forming arbors 55, 54 having small recesses in their extremities to engage the ends of the advanced wires. The arbors are fastened on carriers 46, 47 slidably mounted in supports 45, 44 the carriers each having a lateral projection in which is mounted a rod 49, 48, extending through the support 45, 44.

In line with this rod a rod 105, 84 extending through the block 66, 65 is secured to a member 63, 64. When one of these members, for example member 64, is advancing, the wire fed by it enters the recess in the arbor 64, and rod 84 engaging rod 44 draws arbor 54 out of the link just formed, the wire at the same time advancing in connection with the arbor. So the wire is meshed surely into the link. This is of great importance in such cases where the wire is not fully straight and therefore has a tendency to miss the link in which it is to be meshed. When some time before member 63 is returned, spring 50 has moved back the arbor 55 over the wire, this motion being limited by the screw 52. The severed wire is now to be bent down into a U shaped form between the jaws. To this end the support 45, 44 is slidably mounted with the plunger 107 in a block 58, $58^a$ and is moved down against the pressure of a spring 57, 56 by a crank lever 40, 43 operated by the cams 39, 38 on the main cam shaft 2. The crank levers 40, 43 are rotatably mounted by means of shafts 42 secured in bearings 41 of the bed plate 1.

Two cutters 25, 94, Fig. 17 are secured by screws 112$^b$, 113$^b$ in cutter blocks 114$^b$, 115 slidably mounted and secured in their positions by screws 116, 117 on the head 118 of an arm 35. This arm is secured on a pivot 36, mounted in bearings 37 of the bed plate 1. The cutters are operated by a lever 32 and a rod 33 engaging the cutter head 118. The lever 32 rides with a roll on the cam 31 of the cam shaft 2 and is operated by it twice when the cam shaft makes one revolution. The cutters move down both at the same time but they cut the wire only at a point where it is fed over the anvils. Springs 110 and 34 cause the plunger 33, lever 32 and arm 35 to return, when lever 32 is released by the cam. The lever 32 is pivoted in bearings 111 together with a double lever 27, the two ends of which are operated by cams 28, 29 of the main shaft 2, the front ends being joined and engage a rod 26 on the end of which is secured the die 104. This has a cruciform nut, adapted to close the ends of chain links which are formed over both arbors 55 and 54. Rod 26 is forced back by spring 30 when lever 27 is released by the cams 28, 29.

Figure 1:
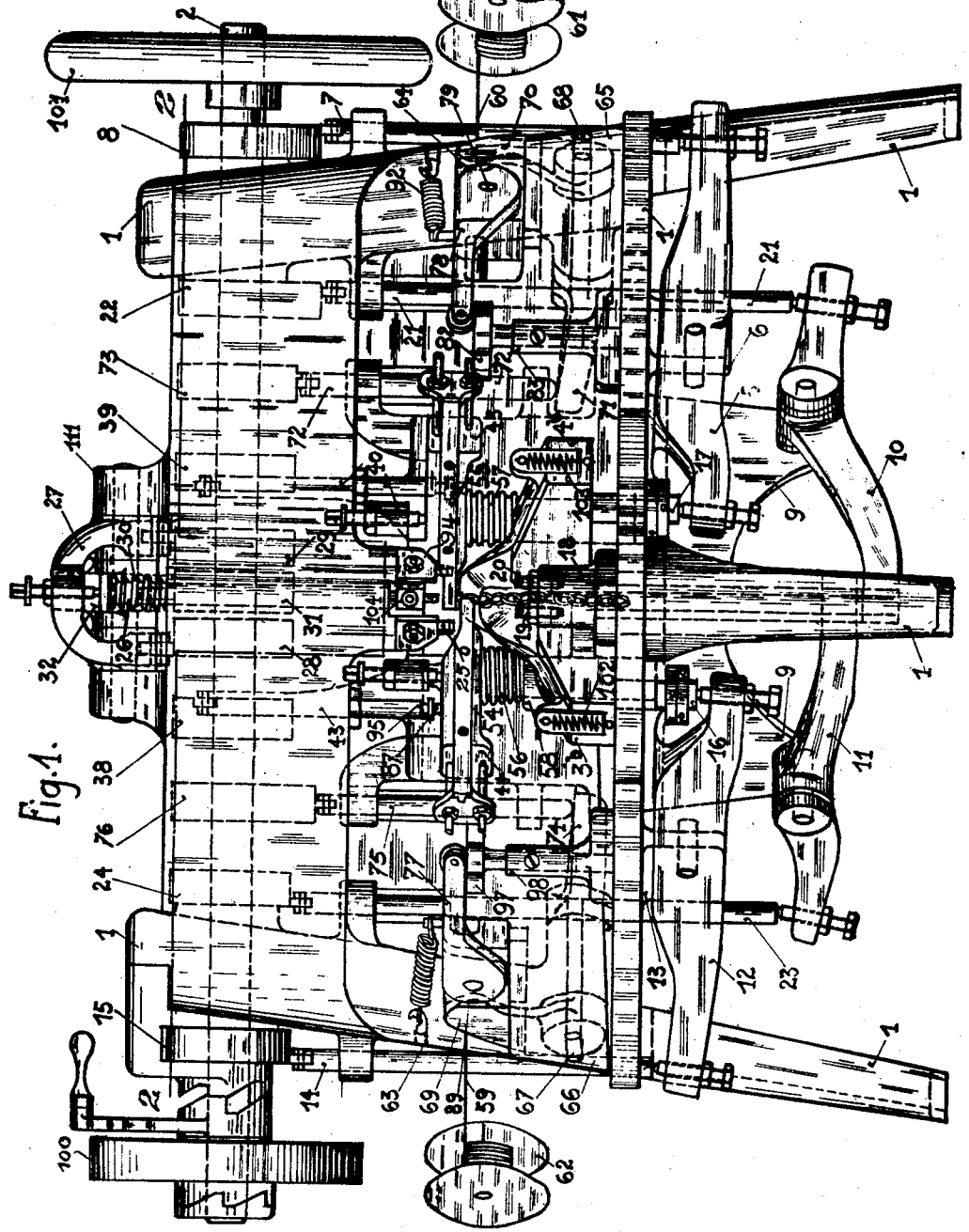

The operation of the machine is as follows:

As illustrated in Figs. 1, 3, 4 the jaws 4$^c$ are in raised position still holding the last formed link on the forming arbor 54. The wire feeding block 66 is swung up, pin 91 has released the wire 59 and pin 87 has bound it. The member 63 may now be forced back by spring 93 without moving the wire. The die 104, see Fig. 9 has closed the ends of the link, the arbor 55 is in its upper position and has been moved forward by spring 50 when member 63 with rod 105 has been drawn back. At this time feeding block 65 rests on the bed plate 1, pin 86 has released and pin 81 has bound the wire 60, member 64 has been forced back by spring 92.

Now member 64 advances under action of its cam 73, rod 72 and arm 70 and feeds the wire 60 into the recess of arbor 54, then engages rods 84 and 48 and forces the wire and arbor together to the position shown in Fig. 10. The wire after being severed by cutter 94 lies then with one end upon the anvil 85, with the other in arbor 54. The jaws 4$^c$ now release the link and move down. At the same time the support 45 with arbor 55 is caused by cam 39 and crank lever 40 to move down, bending the wire end between the jaws 3$^c$ which are then forced together and form the link over the arbor 55, Fig. 9. Jaws 3$^c$ and arbor 55 are now raised to a position to permit the advancing wire 59 to pass through the just formed link. The die 104 closes the ends of this link, arbor 54 raises to a position above the link and member 63 forces back the arbor 55, at the same time feeding wire 59 and meshing it into the last link of the chain. Jaws 3$^c$ now move down and the wire, after having been severed, is bent by arbor 54, between the jaws 4$^c$. These jaws are raised to their upper positions and all operations are repeated as above-described.

It is already said, that two links of a chain are formed during one revolution of the cam shaft of the machine.

It is further of great importance that there is no rotation of the jaw-heads.

Therefore more time is available for forming the links in consequence of which my new machine is adapted to work with an essentially greater rapidity than the machines of this type before known. The construction of the machine is such that two jaw-heads are united as hereinbefore described, the form of the bed of the machine and the diagonal arrangement of the several mechanisms allows great facility in the formation and meshing of the links in the making of a chain. The machine above described is adapted for making chains consisting of similar links or links differing alternately in shape, material or thickness of wire, but the principles of my invention, especially the diagonal arrangement of two sets of link-forming tools, may be also utilized in a machine making other kinds of chains. In making for example chains with links, seen in Fig. 7, the wire is fed in a suitable length by one of the wire-feeding mechanisms, for example by the left, the jaws 4$^c$ after having formed a loop, see Figs. 18, 19, in the manner above-described, hold the link and a suitable tool placed in the right wire feeding mechanism bends the two ends of the link at an angle of 90° around an arbor 119. Then a suitable die bends the ends down as seen in Fig. 20, the jaws 4$^b$ release the link and jaws 3$^c$ finish the operation by bending the link into the form seen in Fig. 21. Now the arbor 119 is withdrawn and a new length of wire meshed. In a similar manner chains of the form seen in Fig. 8 are made.

It is to be understood, that the embodiment of the invention described is merely illustrative and that the invention is not limited to the specific structure shown but includes modifications and changes which come within the scope of the appended claims.

Having thus described the invention, what is claimed as new and desired to be secured by Letters Patent is as follows:—

1. A chain making machine including a support, two sets of chain making mechanisms extending transversely one of the other on opposite sides of said support, said mechanisms each including link forming members and wire feeding mechanism to mesh and secure the links one with another, and a single cam shaft extending transversely of both of said chain making mechanisms and having cams of duplicate construction arranged for alternately operating said sets of chain making mechanisms.

2. A chain making machine including a support, two sets of chain making mechanisms extending transversely one of the other on opposite sides of said support, said mechanisms each including link forming members for closing opposite sides of a link toward each other, said members being vertically movable, and said mechanisms also including wire feeding mechanisms, and a single cam shaft extending transversely of both of said chain making mechanisms and having a cam for vertically moving each of said link forming members.

3. A chain making machine including a support, two sets of chain making mechanisms extending transversely one of the other on opposite sides of said support, said mechanisms each including link forming members and wire feeding mechanism to mesh and secure the links one within another, and a single cam shaft extending transversely of both of said mechanisms and having cams of duplicate construction arranged for alternately operating said wire feeding mechanisms of said sets of chain making mechanisms.

4. A chain making machine including a support, two sets of chain making mechanisms extending transversely one of the other on opposite sides of said support, said mechanisms each including link forming members, wire feeding mechanisms and a wire forming mandrel to mesh and secure the links one within another, and a single cam shaft extending transversely of both of said mechanisms and having cams of duplicate construction arranged for alternately operating said wire forming mandrels of said sets of chain making mechanisms.

5. A chain making machine including a support, two sets of chain making mechanisms extending transversely one of the other on opposite sides of said support, said mechanisms each including link forming members to mesh and secure the links one within another, a wire feeding mechanism and a wire cutter, and a single cam shaft extending transversely of both of said mechanisms and having cams of duplicate construction arranged for alternately operating said sets of cutters of said sets of chain making mechanisms.

6. A chain making machine including a support, two sets of chain making mechanisms extending transversely one of the other on opposite sides of said support, said mechanisms each including link forming members and wire feeding mechanism, a link end closing member common to both of said mechanisms, and a single cam shaft extending transversely of both of said mechanisms and having a cam for operating said link end closing member.

7. A chain making machine including a support, two sets of chain making mechanisms extending transversely one of the other on opposite sides of said support, said mechanisms each including wire feeding mechansms and link forming members for closing opposite sides of a chain link toward each other to mesh and secure the links one within another, a single cam shaft extending transversely of both of said mechanisms, levers of duplicate construction each extending lengthwise of each of said mechanisms and having one end operatively connected with one of said link forming members and its opposite end underlying a cam on said cam shaft, cams of duplicate construction arranged on said cam shaft for alternately operating said levers, and means connecting each of said cams with each of said levers.

8. A chain making machine including a support, two sets of chain making mechanisms extending transversely one of the other on opposite sides of said support, said mechanisms each including vertically movable link forming members for closing opposite sides of a chain link toward each other, said mechanisms also each including a wire feeding mechanism, a lever extending lengthwise to each of said mechanisms and with one end operatively connected with said link forming members to move them vertically, a cam on said cam shaft overlying the opposite end of each of said levers, and an operating connection between each of said levers and one of said cams.

9. A chain making machine including a support, two sets of chain making mechanisms extending transversely one of the other on opposite sides of said support, said chain making mechanisms each including link forming members for closing opposite sides of a chain link together and wire feeding mechanism movable lengthwise of said chain making mechanisms, a single cam shaft extending transversely of both of said mechanisms, wire feeding shafts each extending transversely of said cam shaft and of said chain making mechanisms, a connection between each of said wire feeding shafts and said wire feeding mechanism, a cam on said cam shaft for operating each of said mechanisms, and a connection between each of said wire feeding shafts and one of said cams on said cam shaft.

10. A chain making machine including a support, two sets of chain making mechanisms extending transversely one of the other on opposite sides of said support, said mechanisms each including link forming members for closing opposite sides of a chain link together, a wire feeding mechanism and a vertically moving link forming mandrel, a single cam shaft extending transversely of both of said chain making mechanisms, mandrel operating members each extending transversely of said cam shaft and of one of said chain making mechanisms, a cam on said cam shaft for operating each of said mandrel operating members, a connection between each of said mandrel operating members and one of said cams, and a connection between each of said link forming members and one of said mandrel operating members.

11. A chain making machine including a support, two sets of chain making mechanisms extending transversely one of the other on opposite sides of said support, said mechanisms each including link forming members for closing opposite sides of a chain link together, a wire feeding mechanism and a link end closing member appurtenant to both of said chain making mechanisms, a single cam shaft extending transversely of both of said chain making mechanisms, a member extending transversely to said cam shaft and to both of said chain making mechanisms and operatively connected at one end with said link end closing member, a cam on said cam shaft, and a connection between said cam and said member for operating said link end closing member.

12. A chain making machine including a support, a pair of link closing jaws arranged transversely to another pair of link closing jaws, the members of each pair of jaws being located on opposite sides of a line extending lengthwise through the members of the other pair of jaws, means for feeding a wire to each pair of said jaws, and means for alternately closing the members of said pairs of jaws together to form chain links and to mesh and secure the links one within another.

13. A chain making machine including a support, a pair of link closing jaws arranged in cruciform shape and movable toward a point located centrally between the inner ends of said jaws, means for simultaneously moving the opposite members of each pair of jaws toward each other to form a chain link and for alternately operating each pair of jaws, and means for feeding a wire to each of said pairs of jaws.

14. A chain making machine including a support, a pair of link closing jaws arranged transversely to another pair of link closing jaws, the members of each pair of jaws being pivotally mounted and located on opposite sides of a line extending lengthwise through the members of the other pair of jaws, means for alternately operating the pairs of jaws to form chain links, and means for feeding a wire to each of said pairs of jaws.

15. A chain making machine including a support, a pair of link closing jaws arranged in line opposite each other, a mandrel extending across the line of said jaws and between them, means for feeding a wire to said mandrel, and means for imparting relative movement between said mandrel and said jaws to force said wire in engagement with said jaws between them and around said mandrel, and means for closing said jaws together against said wire.

16. A chain making machine including a support, a pair of link forming jaws oppositely arranged with their inner ends spaced apart, a mandrel extending transversely of said jaws over the space between their inner ends, means for feeding a wire to said mandrel, means for moving said mandrel toward the space between said jaws to force said wire in engagement with said jaws between them, and means for closing said jaws together against said wire.

17. A chain making machine including a support, a pair of link closing jaws spaced apart and movable toward each other, said pair of jaws being vertically movable, a mandrel located over the space between the ends of said jaws, means for feeding a wire to said mandrel, means for moving said mandrel toward the space between said jaws to force said wire in engagement with said jaws between them, means for closing said jaws toward each other against said wire, and means for imparting vertical movement to said jaws.

18. A chain making machine including a support, a pair of link closing jaws arranged transversely to another pair of link closing jaws, each of said pairs of jaws being vertically movable independently of the other pair, means for alternately closing the members of said pairs of jaws toward each other to form a chain link between them, and means for feeding a wire to said jaws.

19. A chain making machine including a support, a pair of link closing jaws arranged transversely to another pair of link closing jaws, the members of each of said pairs of jaws being pivotally mounted, means for alternately imparting vertical movement to each pair of jaws, means for alternately closing the members of each pair of jaws together to form a chain link, and means for feeding a wire to each pair of jaws.

20. A chain making machine including a support, a pair of link closing jaws arranged transversely to another pair of link closing jaws, the members of each pair of jaws being located on opposite sides of a central point between the adjacent ends of said jaws, a mandrel appurtenant to each pair of jaws and adapted to be projected over said central point, means for feeding a wire to each of said mandrels, means for imparting relative movement between each pair of jaws and a mandrel to form a chain link upon the latter, and means for alternately operating the pairs of jaws to close their members together.

21. A chain making machine including a support, a pair of link closing jaws arranged transversely to another pair of link closing jaws, the adjacent ends of said jaws being located on opposite sides of a central point, a mandrel appurtenant to each pair of jaws, means for projecting each mandrel over said point, means for feeding a wire to each mandrel, means for imparting relative movement between each mandrel and a pair of jaws to form a chain link in engagement with said jaws and between them, and means for closing said jaws together to complete the formation of said link.

22. A chain making machine including a support, a pair of link closing jaws arranged transversely to another pair of link closing jaws, the members of said pairs of jaws being located on opposite sides of a central point between their adjacent ends, a mandrel appurtenant to each pair of jaws, means for moving said mandrels over said point, means for feeding a wire to each of said mandrels, means for moving each of said mandrels toward said point to close the ends of a wire in engagement with said jaws together, and means for closing said jaws toward each other to complete the formation of a chain link.

23. A chain making machine including a support, two pairs of link forming jaws arranged one set transversely of the other, two telescoping sleeves one supporting each pair of jaws, means for alternately operating each of said sleeves to impart vertical movement to one pair of jaws, means for feeding a wire to each pair of jaws, and means for operating each pair of jaws in the formation of a chain link.

24. A chain making machine including a support, a pair of link closing jaws arranged transversely to another pair of link closing jaws, forked levers each having each of its branches operatively connected with the members of each pair of jaws, means for feeding a wire to each pair of jaws and means for alternately operating said levers to actuate said jaws to alternately form links from said wires.

25. A chain making machine including a support, a pair of link closing jaws arranged transversely to another pair of link closing jaws, a pair of jaw operating levers arranged transversely one to another, said levers each being forked and with each branch of said fork operatively connected with the opposite members of said pair of jaws, means for feeding a wire to each pair of jaws, and means for operating each of said levers to alternately close said jaws together in the formation of a chain link.

26. A chain making machine including a support, a base mounted on said support, a pair of link closing jaws pivotally mounted on said base, a second pair of link closing jaws pivotally supported and extending transversely of the first mentioned pair, forked levers each having its branches connected with a pin extending through said base underneath said jaws, means for feeding a wire to each pair of jaws, and means for alternately operating each of said levers to actuate said jaws.

27. A chain making machine including a support, a base mounted on said support, a pair of link closing jaws pivotally mounted on said base, a support extending through said base to receive a second pair of jaws arranged transversely of the first pair, a second pair of jaws pivotally mounted on said support, a pair of actuating levers each having its branches extending underneath said base to actuate a pin engaged with one of said jaws, means for feeding a wire to each of said pairs of jaws, and means for actuating said levers to close said jaws in the formation of a chain link.

28. A chain making machine including a support, a base, a pair of link closing jaws pivotally mounted on said base, a support extending through said base, a second pair of link closing jaws pivotally mounted on said support, means for imparting longitudinal movement to said support, a pair of forked levers each having one of its branches underlying one of said jaws, a pin connecting each branch with one of said jaws, means for feeding a wire to each of said pairs of jaws, and means for alternately actuating said levers in the formation of a chain link.

29. A chain making machine including a supporting frame, a base, a support for said base, means for imparting longitudinal movement to said support, a pair of jaws pivotally mounted on said base, a second support, a pair of jaws pivotally mounted on said second support and transversely arranged with respect to the first pair of jaws, a pair of forked levers each having one of its branches operatively connected with one of said jaws, means for feeding a wire to each pair of jaws, and means for alternately operating said levers to actuate said jaws in the formation of a chain link.

30. A chain making machine including a support, a base, a tubular support for said base, a pair of link forming jaws pivotally mounted on said base, means for imparting longitudinal movement to the tubular support for said base, a second support located within the support for said base, a pair of link forming jaws pivotally mounted on said second support, means for imparting longitudinal movement to said second support, and means for pivotally operating each of said pairs of jaws.

31. A chain making machine including a support, a base, a pair of link closing jaws pivotally mounted on said base, a tubular support for said base, means for imparting longitudinal movement to said tubular support, a second tubular support extending through the support for said base, a second pair of link closing jaws, means for feeding a wire to each of said jaws, and means for alternately operating said jaws to form chain links in a chain to extend downwardly through the opening in the central support.

32. A chain making machine including a support, a pair of link closing jaws arranged transversely to another pair of link closing jaws, a mandrel appurtenant to each pair of jaws and movable over the space between said jaws, said mandrels each having a recess in its end to receive the end of a wire, means for simultaneously and cotemporaneously moving a mandrel and for feeding a wire with its end located in said recess to guide said wire through a previously formed link, and means for operating said jaws in the formation of a chain link.

33. A chain making machine including a support, a pair of link closing jaws arranged transversely to another pair of link closing jaws, two mandrels extending transversely one of the other, each of said mandrels having a recess in its end, means for imparting longitudinal movement to each of said mandrels, means for imparting simultaneous and cotemporaneous feed of a wire with its end located in one of said recesses to feed said wire through a previously formed link, and means for alternately operating each of said pairs of jaws.

34. A chain making machine including a support, two sets of chain making mechanisms extending transversely one of the other on opposite sides of said support, said mechanisms each including link forming members and a wire feeding mechanism to alternately mesh links formed from each of said wires and secure them one within another, a cutter appurtenant to each of said wire feeding mechanisms, a cutter operating lever upon which each of said cutters is mounted, and means for alternately actuating said levers.

35. A chain making machine including a support, two sets of chain making mechanisms each including link forming members and wire feeding mechanism, a link end closing member appurtenant to each of said mechanisms, a forked lever to which said member is secured, and means connected with each of said forks for acting alternately to impart movement to said lever.

36. A chain making machine including a support, two sets of chain making mechanisms each including link forming members and wire feeding mechanism, a cutter operating lever, a cutter supported by said lever, means for operating said lever, a link end closing member, a lever to support said member, said last mentioned lever having two forks located on opposite sides of said cutter operating lever, and means for alternately operating said link end closing lever.

37. A chain making machine including a swinging supporting block, means for swinging said block, a feed member slidably mounted on said block and having means to receive a length of wire, a lever arm pivotally mounted on said feed member, a clamping pin carried by said member and connected with said lever to be actuated thereby to engage said wire and clamp it, a clamping pin carried by said block, a clamping stop located in the path of movement of said last mentioned clamping pin, to actuate the latter to clamp said wire, means for reciprocating said member, and means for actuating said arm.

38. A chain making machine including a swinging supporting block, means for swinging said block, a feed member slidably mounted on said block and having means to receive a length of wire, a lever arm pivotally mounted on said feed member, a clamping pin carried by said member and connected with said lever to be actuated thereby to engage said wire and clamp it, a clamping pin carried by said block, a clamping stop located in the path of movement of said last mentioned clamping pin to actuate the latter to clamp said wire, means for reciprocating said member, and a stop located in the path of movement of said arm to actuate it.

39. A chain making machine including a swinging supporting block, means for swinging said block, a feed member slidably mounted on said block and having means to receive a length of wire, a lever arm pivotally mounted on said feed member, a stop located in the path of movement of said arm to receive said wire between it and said arm to hold said wire, a clamping pin carried by said member and connected with said lever to be actuated thereby to engage said wire to clamp it, a clamping pin carried by said block, a clamping stop located in the path of movement of said last mentioned clamping pin to engage the latter to clamp said wire, and means for reciprocating said member.

40. In a chain making machine, in combination with vertical movable link closing jaws, a swinging supporting block located in the path of movement of said jaws and to be operated thereby, a feed member slidably mounted on said block and having means to receive a length of wire, a lever arm pivotally mounted on said feed member, a clamping pin carried by said feed member and actuated by said lever arm to engage said wire, a clamping pin carried by said block, a clamping stop located in the path of movement of said last mentioned clamping pin to actuate the latter to clamp said wire, means for reciprocating said feed member and means for actuating said arm.

In testimony whereof I affix my signature.

JONATHAN WENZ.